(12) United States Patent
Imbsei et al.

(10) Patent No.: US 6,734,411 B1
(45) Date of Patent: May 11, 2004

(54) METHOD AND APPARATUS FOR CONTROLLING POWER LEVELS OF OPTICAL SIGNALS IN OPTICAL FIBER INTERCONNECTS

(75) Inventors: Dominick J. Imbsei, Somerset, NJ (US); Steven R. Johnson, Monmouth, NJ (US); Gerald Nykolak, Nassau, NY (US); Bruce D. Paulson, Hunterdon, NJ (US); Paul F. Szajowski, Morris, NJ (US); Gerald E. Tourgee, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/675,007

(22) Filed: Sep. 29, 2000

(51) Int. Cl.$^7$ ................................................. G01J 1/32
(52) U.S. Cl. .............. 250/205; 250/227.14; 250/227.15; 250/227.16; 398/15; 398/17
(58) Field of Search ............................. 250/205, 227.11, 250/227.14, 227.15, 227.16; 359/341.1, 341.44, 177; 398/9, 15, 17

(56) References Cited

U.S. PATENT DOCUMENTS

| | | | |
|---|---|---|---|
| 4,449,043 A | 5/1984 | Husbands | |
| 4,543,477 A | 9/1985 | Doi et al. | |
| 4,673,795 A | 6/1987 | Ortiz, Jr. | |
| 4,812,641 A | * 3/1989 | Ortiz Jr. | ..................... 250/205 |
| 4,837,428 A | 6/1989 | Takagi et al. | |
| 4,862,397 A | 8/1989 | Pryor | |
| 4,879,459 A | 11/1989 | Negishi | |
| 5,104,391 A | * 4/1992 | Ingle et al. | ................... 606/11 |
| 5,229,593 A | 7/1993 | Cato | |
| 5,270,537 A | * 12/1993 | Jacobs | ................... 250/227.15 |
| 5,923,453 A | 7/1999 | Yoneyama | ................... 359/177 |
| 6,317,255 B1 | 11/2001 | Fatehi et al. | ........... 359/341.44 |
| 6,323,973 B1 | * 11/2001 | Hongou | ..................... 359/110 |

* cited by examiner

*Primary Examiner*—Edward J. Glick
*Assistant Examiner*—Courtney Thomas

(57) ABSTRACT

In the method and apparatus for providing an optical fiber interconnect, a transmitter transmits an optical signal through an optical fiber. The transmitter does not transmit to a controller, information about the power of the transmitted optical signal near the input end of the fiber. The controller receives an indication of the power of a returned portion of the transmitted optical signal. The controller causes the lowering of the power of the transmitted optical signal to a predetermined level based the received indication.

12 Claims, 1 Drawing Sheet

METHOD AND APPARATUS FOR CONTROLLING POWER LEVELS OF OPTICAL SIGNALS IN OPTICAL FIBER INTERCONNECTS

FIELD OF THE INVENTION

The present invention relates to controlling power levels of optical signals, and more particularly to controlling power levels of optical signals in optical fibers.

BACKGROUND OF THE INVENTION

Optical fibers are often used in conjunction with high power lasers, such as for laser welding and cutting, or medical applications, and the art has developed approaches for enhancing the safety of these systems. For example, U.S. Pat. No. 4,449,043 to Husbands discloses a safety device for a high power fiber optic system, which may present a hazard when an optical connector is unmated. The safety device includes a four-port optical coupler which transmits, to a receiver, a portion of the output power, as well as backscattered energy, which is developed between the glass-to-air and air-to-glass interfaces between adjacent connectors. A comparison between the output power and the backscattered energy is used to disable the laser source when an unmated condition is detected.

U.S. Pat. No. 4,543,477 to Doi et al. discloses a safety device for a medical laser wherein reflected laser light is detected from the exit end surface of a fiber and a shutter is used to stop the laser if a breakage of the fiber is detected. Ortiz Jr., in U.S. Pat. No. 4,812,641, discloses a high power laser for material processing and includes respective photodetectors to sense the laser power exiting a power optical fiber and the laser injection power. The two power levels are compared to detect whether a break in the power transmitting fiber has occurred. U.S. Pat. No. 4,673,795, also to Ortiz Jr., discloses an interlock safety arrangement which includes an optical sensor connected to the controller for turning the laser off when the laser beam has turned on but laser energy does not reach a remote module, indicating a break in the high power transmitting optical fiber.

The described prior art discloses that the power levels before and after the optical fiber are measured and compared. Such an approach leads to disadvantages of complexity at the output end of a fiber and, therefore, additional cost of fabrication and difficulty of operation. Such an approach also causes a loss of optical energy that would have otherwise been delivered to a receiver at output end of the fiber.

SUMMARY OF THE INVENTION

The present invention presents an approach for transmitting high power optical signals through fibers while helping keep the operation safe under regulatory requirements. In the inventive approach, a breakage in the fiber causing a leak of the optical signal outside the fiber is detected and the source of the optical signal is caused to lower the power of the optical signal being fed into the fiber. In the inventive approach, inherently risky power levels generated by the source of optical signals are detected and the source is caused to lower the power of the optical signal.

The inventive approach keeps simple the output end of the fiber transmitting the optical signal and, therefore, lowers the fabrication cost and simplifies operation. It also does not obtain information from the input end of the fiber and therefore conserves the optical energy for transmission into the fiber. Moreover, because of its simpler arrangement, the inventive approach has higher reliability in determining whether the optical fiber is broken.

The present invention achieves the above mentioned advantages by using a fiber optical interconnection structure that at least has an optical fiber, a transmitter arranged to transmit an optical signal into a first end of the optical fiber, and a controller arranged to control the transmitter based on the power of the optical signal coming out of the other end of the fiber. However, the controller does not get information from the transmitter about the power of the optical signal being transmitted to the first end of the fiber. Rather, the controller gets information about the power of the optical signal coining out of the fiber. In an embodiment, the controller causes the transmitter to lower the power input into the optical fiber if the power coming out of the fiber is below an expected threshold amount. This protects the environment from optical signals leaking out of broken fibers and potentially harming individuals. In another embodiment, the controller causes the transmitter to lower the power input into the optical fiber if the power coming out of the fiber is above an expected threshold amount. This protects the system by preventing a runaway situation wherein the optical signal source uncontrollably increases the generated power of the optical signal. Of course the two embodiments may be used together in one system.

BRIEF DESCRIPTION OF THE DRAWINGS

Other aspects and advantages of the present invention will become apparent upon reading the detailed description, and upon reference to the drawings in which.

DETAILED DESCRIPTION

Figure 1:
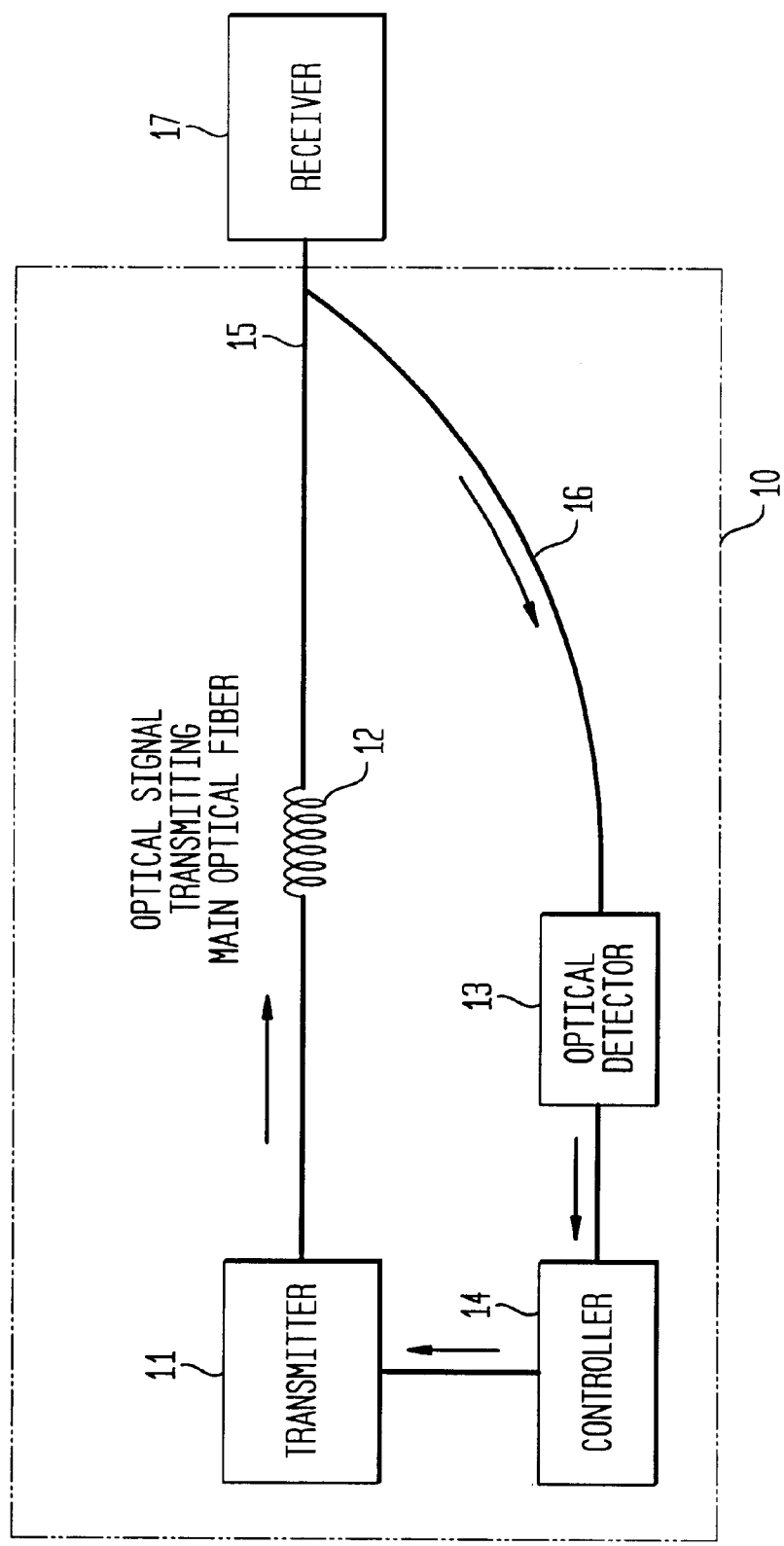
FIG. 1 is a general block diagram illustrating an exemplary embodiment of a fiber optical interconnection structure according to the present invention.

FIG. 1 is a general block diagram illustrating a fiber optical interconnection structure 10 according to a preferred embodiment of the present invention. As shown, the fiber optical interconnection 10 includes a transmitter 11; a first optical fiber connected to the transmitter 11 at one end and connected to a receiver 17 (not necessarily part of the optical fiber interconnection) at the other end; a second optical fiber 16 branching off of the receiver-end 15 of the first optical fiber 12 and connecting to an optical detector 13; and a controller 14 connected to the optical detector 13 and controlling the transmitter 11. It should be noted that the controller 14 does not receive information from the transmitter 11 about the power of the optical signal at the point of its transmission into the first end of the fiber.

The transmitter 11 is the element that inputs the optical signal to the first (main) optical fiber 12. The transmitter 11 includes optics used to focus or direct, or both, the optical signal into the first optical fiber 12—the optics used may be refractive (e.g., lenses) or reflective (e.g., mirrors), or a combination. In an implementation, the transmitter 11 includes the laser used to generate the optical signal along with the elements impressing the signal modulation onto the laser irradiation. In this implementation, the laser can be of any type including, but not limited to, solid state, gaseous, and semiconductor lasers. The laser may be in the form of an oscillator or an oscillator and amplifier(s). The wavelength of the laser may be whatever is necessary or appropriate for the specific application, including but not limited to ultra-violet, visible, infrared, and far infrared spectra. In an alternative implementation, the transmitter 11 receives the optical signal by way of a fiber optical coupling, thus allowing the generation of the optical signal at some location other than the transmitter 11 and transferring the optical signal to the transmitter 11.

The first optical fiber 12 is the medium by which the optical signal is carried to a receiver 17. The characteristics of the first optical fiber 12 are predetermined including the length, optical power rating, and attenuation coefficient as a function of optical wavelength. Generally a fiber material is chosen that has the lowest attenuation for the wavelength of the optical signal being transmitted in the first optical fiber 12.

The end 15 of the first optical fiber 12 has an optical splice tapping a small fraction (e.g., 1/1000) of the optical signal into the second optical fiber 16. The end 15 of the first optical 12 is very near the receiver 17. The receiver end 15 of the optical fiber interconnect 10 allows for a direct optical connection with a receiver 17, as is known in the art of optical interconnection. The second optical fiber 16 could be implemented using the same material used for the first optical fiber 12, but need not have as high an optical power rating as the that of the first optical fiber 12. The first and second optical fibers 12 and 16 can be multi-mode supporting or single-mode supporting fibers. The first and second optical fibers 12 and 16 can be implemented as single-strand or multi-strand fibers.

The second optical fiber 16 is optically connected to an optical detector 13. In one implementation, the optical detector 13 includes a photo-sensitive element (e.g., a PIN photo-diode) and a power measuring element to measure the optical power based on the signal obtained from the photo-diode. In an alternative implementation, the optical detector 13 does not include the power measuring element—in this implementation, the controller 14 would include the power measuring element. The photo-sensitive element choice is driven by a desire to tap off as little of the optical power from the first optical fiber 12 as possible.

The optical detector 13 is operatively connected to the controller 14. The controller 14 receives a signal resulting from the optical detector 13 detecting the power of the tapped optical signal. The controller 14 includes a decision making algorithm that uses information about the characteristics of the first and second optical fibers 12 and 16 (including lengths, attenuation coefficient(s), and the portion of the optical power being tapped into optical fiber 16) and a signal from the optical detector 13 to obtain an indication of the power of the optical signal input by transmitter 11 into optical fiber 12. In dBs, the output power from a fiber equals the input power to the fiber minus the attenuation losses (the product of the length of the fiber and the fiber's attenuation coefficient) minus the insertion losses (obtained by calibrating the insertion couplings and the optical tap at the receiver end 15 of first optical fiber 12). The decision making algorithm also compares the obtained power indication with a first parameter representing an expected desirable optical power input into fiber 12 and a second parameter representing an expected maximum optical power input into fiber 12.

The controller 14 causes the transmitter 11 to lower the input optical power to a predetermined level (set by regulatory and safety standards, including shutting down the laser) if the controller 14 determines that the indicated optical power input to the first fiber 12 is below the first parameter by a specific threshold. Note that this can occur only if the input optical power is somehow not causing an indication of optical power at the controller 14 and, therefore, the appropriate risk reducing assumption is that there is a breakage in the first optical fiber 12. Other events (e.g., a breakage in the second optical fiber 16, a malfunctioning of the optical detector 13, . . . etc) may lead to the same result thus yielding false positives. The inventive approach herein presented, however, uses only one optical fiber 16 to ultimately provide information to the controller 14 and therefore would yield fewer false positives. If, for any reason, the controller 14 does not receive a signal from the optical detector 13, then it concludes that the first optical fiber 12 has a breakage.

The controller 14 also causes the transmitter 11 to lower the input optical power to a predetermined level (including controlling or adjusting the operation of the laser to lower and safer power levels, or shutting down the laser) if the controller 14 determines that the indicated optical power input to the first fiber 12 is above the second parameter by a specific threshold. Note that this can occur if the laser operation is yielding undesirably high optical power levels. Lowering the optical power in this case protects the interconnect equipment (e.g., the transmitter 11, including the laser if part of the transmitter 11, the optical fibers 12 and 16, and the optical detector 13) in addition to a would be receiver 17 from the potential harm of unexpectedly high optical powers. Lowering the optical power in this case also protects individuals from potential harm.

The first and second parameters and the comparison thresholds can be changed and are settable by operators based on the specifics of the application and/or regulatory requirements.

In one implementation, the decision-making algorithm of the controller 14 is software in a processor. Alternatively the decision-making algorithm could be implemented by hardware including digital or analog circuits, digital signal processors, or programmable logic arrays, or combinations thereof including software.

The controller 14 causing the transmitter 11 to lower the input optical power can be achieved in one implementation wherein the controller 14 directly influences the operation of the transmitter 11, e.g., by interposing a shutter in front of the transmitter 11, thus reducing partially or blocking completely the optical signal being input into the first optical fiber 12. Alternatively, a shutter can be interposed inside the laser cavity thus stopping the lasing action and consequently shutting down the laser. Alternatively, a variable attenuator in the laser cavity, or outside of it, can be controlled thus affecting the output optical power. Alternatively the electrical power fed to the optical pumps of the laser can be controlled thus affecting the output optical power. In another implementation, lowering of the input optical power into the first optical fiber 12 can be achieved by the controller 14 indirectly influencing the transmitter 11 (e.g., by sending a parameter to which a processor in the transmitter 11 responds) to perform any of the actions mentioned in this paragraph.

The embodiment of the invention, as described above with respect to FIG. 1, presents the optical fiber interface 10 without including the receiver 17. The receiver end 15 of the optical fiber interconnect 10 allows for a direct optical connection with a receiver 17, as is known in the at of optical interconnection. Another advantage of the embodiment described with respect to FIG. 1 is that of flexibility and interchangeability: Keeping simple the receiver end 15 of the optical fiber interconnect 10 makes both the optical fiber interconnect 10 and the receiver 17 easily replaceable. For example, an optical fiber interconnect 10 can be used with different receivers 17. Conversely, a receiver 17 can be used with different optical fiber interconnects 10.

An alternative embodiment of the invention is a system that includes the optical fiber interconnect 10 and the receiver 17.

In the embodiments according to this invention, the receiver 17 could be a free space laser communication transmitter. The receiver 17 could also be an output unit implemented as a laser cutting, heating, imaging, printing, or welding instrument. The receiver 17 could also be a medical instrument used in surgical procedures involving laser burning, cauterizing, cutting, or scarring.

Although the present invention has been described in considerable detail with reference to certain embodiments, it should be apparent that various modifications and applications of the present invention may be realized without departing from the scope and spirit of the invention.

Scope of the invention is meant to be limited only by the claims presented herein.

We claim:

1. A method for controlling optical signal power levels in an optical fiber interconnection having a transmitter operatively connected to a controller and optically connected to a first end of an optical fiber having two ends, said method comprising:

transmitting, by said transmitter, an optical signal through said optical fiber and not transmitting, by said transmitter to said controller, information about the power of the transmitted optical signal near said first end of said optical fiber;

receiving, by said controller, a returned portion of the optical power of the transmitted optical signal;

measuring the received returned portion of the optical power;

calculating a parameter using the measured received returned power; and controlling the transmitter to lower the power of said transmitted optical signal to a predetermined level if the calculated parameter is less than a first threshold value.

2. The method of claim 1, wherein said controlling step lowers the power of said transmitted optical signal to said predetermined level if the calculated parameter is one of less than a first threshold and greater than a second threshold value.

3. The method of claim 2, further comprising:

generating the optical signal by a laser.

4. The method of claim 2, wherein the receiving step receives the portion of the optical power of the transmitted optical signal via a second optical fiber.

5. The method of claim 2, further comprising:

tapping off a portion of the optical signal near the second end of said optical fiber, and wherein the receiving step receives the tapped off portion as the returned portion.

6. A method for controlling a power level of an optical signal transmitted in an optical fiber by a transmitter operatively connected to a first end of the optical fiber, comprising:

tapping off a portion of the transmitted optical signal from the optical fiber;

measuring a power of the tapped portion of the transmitted optical signal; and controlling the transmitter to lower the power level of the transmitted optical signal if the measured power is less than a threshold.

7. An apparatus for controlling optical signal power levels in an optical fiber interconnection, said apparatus comprising:

an optical fiber having two ends;

a transmitter operatively connected to a first end of said optical fiber and arranged to transmit an optical signal through said optical fiber;

an optical detector, operatively connected to said optical fiber, detecting a portion of the transmitted optical signal power near said the second end of said optical fiber; and a controller operatively connected to said optical detector, said controller arranged to cause said transmitter to lower the power of the transmitted optical signal to a predetermined level if a parameter based on said portion detected by said optical detector is less than a first threshold value, said controller not operatively connected to said transmitter as to receive information about the power of the optical signal near said first end of said optical fiber.

8. The apparatus of claim 7, wherein said controller is arranged to cause said transmitter to lower the power of the transmitted optical signal to said predetermined level if a parameter based on said detected portion is one of less than a first threshold and greater than a second threshold value.

9. The apparatus of claim 7, further comprising:

a laser arranged to generate the transmitted optical signal.

10. The apparatus of claim 7, further comprising:

a second optical fiber having one end optically connected to said optical detector and having another end optically connected to said optical fiber near the second end of said optical fiber, said second fiber carrying said detected portion to said detector.

11. The apparatus of claim 10, wherein said second optical fiber is connected to said optical fiber by an optical tap.

12. An apparatus for controlling a power level of an optical signal transmitted in an optical fiber, comprising:

an optical splice to tap off a portion of the optical signal from the optical fiber;

a controller operatively connected to the optical splice to measure a power level of the tapped portion of the optical signal and to control a transmitter to lower the power level of the transmitted optical signal if the measured power level is below a threshold.

* * * * *

UNITED STATES PATENT AND TRADEMARK OFFICE
CERTIFICATE OF CORRECTION

PATENT NO. : 6,734,411 B1
DATED : May 11, 2004
INVENTOR(S) : Dominick J. Imbesi et al.

It is certified that error appears in the above-identified patent and that said Letters Patent is hereby corrected as shown below:

<u>Title page,</u>
Item [12], "Imbsei" should read -- Imbesi --;
Item [75], Inventors, "Dominick J. Imbsei" should read -- Dominick J. Imbesi --.

Signed and Sealed this

Third Day of May, 2005

JON W. DUDAS
*Director of the United States Patent and Trademark Office*